US006802881B2

(12) United States Patent
Illingworth et al.

(10) Patent No.: US 6,802,881 B2

(45) Date of Patent: Oct. 12, 2004

(54) ROTATING WAVE DUST SEPARATOR

(75) Inventors: Lewis Illingworth, Kesington, NH (US); David Reinfeld, Englewood, NJ (US)

(73) Assignee: Vortex HC, LLC, Englewood, NJ (US)

( * ) Notice: Subject to any disclaimer, the term of this patent is extended or adjusted under 35 U.S.C. 154(b) by 15 days.

(21) Appl. No.: 10/377,151

(22) Filed: Feb. 27, 2003

(65) Prior Publication Data

US 2004/0118091 A1 Jun. 24, 2004

Related U.S. Application Data

(63) Continuation-in-part of application No. 10/371,241, filed on Feb. 20, 2003, which is a continuation-in-part of application No. 10/370,034, filed on Feb. 19, 2003, which is a continuation-in-part of application No. 10/025,376, filed on Dec. 19, 2001, now Pat. No. 6,719,830, which is a continuation-in-part of application No. 09/835,084, filed on Apr. 13, 2001, now Pat. No. 6,687,951, which is a continuation-in-part of application No. 09/829,416, filed on Apr. 9, 2001, now Pat. No. 6,729,839, which is a continuation-in-part of application No. 09/728,602, filed on Dec. 1, 2000, now Pat. No. 6,616,094, which is a continuation-in-part of application No. 09/316,318, filed on May 21, 1999, now Pat. No. 6,595,753.

(51) Int. Cl.[7] .................................................. B01D 45/14

(52) U.S. Cl. ............................. 55/394; 55/406; 55/416; 55/423

(58) Field of Search .......................... 55/394, 406, 416, 55/400, 423, DIG. 3; 415/169.2

(56) References Cited

FOREIGN PATENT DOCUMENTS

DE 3417689 A1 * 11/1985 .................. 55/406

* cited by examiner

*Primary Examiner*—Robert A. Hopkins

(74) *Attorney, Agent, or Firm*—Ward & Olivo

(57) ABSTRACT

The present invention is a separation apparatus that combines the effects of a cylindrical vortex and a series of partial toroidal vortices. The toroidal vortex and cylindrical vortex fluid flows combined provide better separation than either fluid flow alone. Moreover, the present invention may be constructed such that an arbitrary number of partial toroidal vortices, in series, having relatively small radii are formed thereby allowing any level of separation to be achieved.

50 Claims, 6 Drawing Sheets

ROTATING WAVE DUST SEPARATOR

CROSS REFERENCE TO OTHER APPLICATIONS

This application is filed as a continuation-in-part of co-pending application Ser. No. 10/371,241 entitled Combined Toroidal and Cylindrical Vortex Dust Separator," filed Feb. 20, 2003, which is a continuation-in-part of co-pending application Ser. No. 10/370,034 entitled "Filterless Folded and Ripple Dust Separators and Vacuum Cleaners Using the Same," filed Feb. 19, 2003, which is a continuation-in-part of co-pending application entitled "Axial Flow Centrifugal Dust Separator," filed Dec. 12, 2002, which is continuation-in-part of application Ser. No. 10/025,376 entitled "Toroidal Vortex Vacuum Cleaner Centrifugal Dust Separator," filed Dec. 19, 2001, now U.S. Pat. No. 6,719,830 which is a continuation-in-part of application Ser. No. 09/835,084 entitled "Toroidal Vortex Bagless Vacuum Cleaner," filed Apr. 13, 2001, now U.S Pat. No. 6,687,951 which is a continuation-in-part of application Ser. No. 09/829,416 entitled "Toroidal and Compound Vortex Attractor," filed Apr. 9, 2001, now U.S. Pat. No. 6,729,839 which is a continuation-in-part of application Ser. No. 09/728,602, filed Dec. 1, 2000, now U.S. Pat. No. 6,616,094 entitled "Lifting Platform," which is a continuation-in-part of Ser. No. 09/316,318, filed May 21, 1999, now U.S. Pat. No. 6,595,753 entitled "Vortex Attractor."

TECHNICAL FIELD OF THE INVENTION

The present invention relates to an improved centrifugal and toroidal vortex dust separator. Specifically, the improved dust separator centrifugally separates dust by ejecting particles into a series of collectors. However, the cylindrical vortex flow in the separator is supplemented by a series of partial toroidal vortex fluid flows. The combined effect of the these fluid flows yields a more efficient and complete separation than other devices in the art.

BACKGROUND OF THE INVENTION

Centrifugal separation is a well known technique in the art of separation, including separation of solids from liquids, liquids from gases, and liquids from liquids. However, centrifugal separation has been carried out in a number of ways.

For instance, FIG. 1 depicts a perspective view of the invention disclosed in co-pending application "Axial Flow Centrifugal Dust Separator," filed Dec. 12, 2002, which is hereby incorporated herein by reference. Separator 100 comprises housing 105, impeller 102, rotating drum 103, and annular separation chamber 104. Fluid flow 101 travels through separation chamber 104 in a cylindrical vortex with radius R. Dust and debris are thrown outward into a collector (not shown). Yet, the art has not fully benefited from the use of toroidal vortex fluid flow in conjunction with cylindrical vortex fluid flow. By only utilizing a cylindrical vortex fluid flow, the effectiveness of separation is limited. To verify this, the forces maintaining a cylindrical vortex fluid flow must be analyzed. Generally, particles in a cylindrical vortex exhibit an acceleration equal to $V^2/R$, wherein V=tangential speed of the particle and R=radius of the cylindrical vortex. Thus, in order to maintain a cylindrical vortex fluid flow, a net force equal to $mV^2/R$, wherein m=mass of a particle, must be applied to each particle. In centrifugal separation, dust and debris particles have larger masses than fluid particles, therefore requiring a larger force to hold them into the cylindrical vortex. Separation occurs when $mV^2/R$ is made sufficiently high such that dust and debris particles cannot be held within the cylindrical vortex and consequently, are ejected. Because m is constant, $mV^2/R$ can be increased only by increasing V or decreasing R. V can be increased depending on the limitations of the system, i.e., power of the motor, strength of the apparatus, etc. There are also limitations on how far R may be decreased because a decrease in R will also decrease the cross-sectional area of the separator, thereby limiting the throughput capacity of the device.

By combining a toroidal vortex fluid flow with the cylindrical vortex fluid flow discussed above, the limitations of R, and thus, throughput capacity, can be overcome. Side and perspective views of a simplified version of this combined fluid flow are depicted in FIGS. 2A and 2B, respectively. The actual fluid flow comprises multiple layers contained within each other. The combined flow has an overall radius R similar to that described for a cylindrical vortex. The combined fluid flow also has an inner radius r that is significantly smaller than overall radius R. Within the toroidal component of fluid flow (i.e., rotation around inner radius r) the tangential velocity is v and thus, a force of $mv^2/r$ is required to hold a particles within this fluid flow. Because r is so small, this force will be relatively high. Moreover, the force required to hold dust and debris particles within the combined fluid flow is significantly higher than the force required for either a cylindrical vortex or a toroidal vortex alone. The combined fluid flow will ultimately produce a more efficient and complete separation than cylindrical vortex fluid flow or toroidal vortex fluid flow alone. Such an efficient separation allow dust and debris to be ejected from the fluid flow more quickly and completely.

Some of the benefits of the combined fluid flow have been realized by separators disclosed in parent application "Combined Toroidal and Cylindrical Vortex Dust Separator," filed Feb. 20, 2003, which is hereby incorporated herein by reference. An example of combined toroidal and cylindrical vortex separator 300 is disclosed in FIG. 3. Fluid is impelled and spun into a cylindrical vortex by impeller 301 driven by motor 302. In order to supplement the cylindrical vortex, fluid flow 303 is guided into a partial toroidal vortex along flow path 304. The combined effects of the cylindrical and toroidal vortices throw dust and debris into annular collector 305. Dust and debris particles may follow typical ejection path 306. The pressure in annular collector 305 is higher than the pressure in fluid flow 303, thereby stabilizing the toroidal vortex. However, this higher pressure does not inhibit dust and debris from being ejected into annular collector 305. Subsequent to ejection of dust and debris, cleaned fluid flow 307 continues downstream to exit the system. By combining toroidal and cylindrical vortex fluid flows, the apparatus separates more effectively than either fluid flow utilized individually.

The aforementioned separator directs fluid flow into a single partial toroidal vortex. In light of the parent application "Filterless Folded and Ripple Dust Separators and Vacuum Cleaners Using the Same," filed Feb. 19, 2003, which is hereby incorporated herein by reference, the aforementioned separator may utilize multiple fluid flow redirections. An example of folded separator 400 is depicted in FIG. 4. Here, fluid flow 401 enters into a series of deflectors 402. These deflectors form collectors 403 and redirect fluid flow into a zigzagging path. During each redirection, dust and debris are ejected centrifugally into collectors 403. Dust and debris particles may follow typical ejection paths 404. As in the separator of FIG. 3, pressure differentials between fluid flow 401 and collectors 403 maintained the curved path of fluid flow 401 without preventing dust and debris from being ejected into collectors 403. With this separator, fluid flow 401 may be redirected an arbitrary number of times to effect any level of separation.

The present invention benefits from the advantages of both of these apparatuses. Thus, combined fluid flows are utilized in a system which can redirect fluid flow many times.

Although the present invention is unique and novel, in order to fully understand it in its proper context, the following references are provided: Parkinson U.S. Pat. No. 499,799 (hereinafter referred to as "Parkinson"); Wingrove U.S. Pat. No. 768,415 (hereinafter referred to as "Wingrove"); Monson et al. U.S. Pat. No. 4,323,369 (hereinafter referred to as "Monson"); Michel-Kim U.S. Pat. No. 4,541,845 (hereinafter referred to as "Michel-Kim"); Richerson U.S. Pat. Nos. 4,927,437 and 4,973,341 (hereinafter referred to as the "Richerson" patents); Mignot U.S. Pat. No. 5,401,422 (hereinafter referred to as "Mignot"); Moredock U.S. Pat. Nos. 5,656,050 and 5,766,315 (hereinafter referred to as the "Moredock" patents); and Jen U.S. Pat. No. 6,461,513 B1 (hereinafter referred to as "Jen").

Parkinson discloses a dust separator that employs a series of S-shaped sheets around which air flows. When air passes through these sheets, a curved flow pattern that ejects dust is developed. The ejected dust then falls downward for removal. In contrast, the present invention utilizes the combined effect of cylindrical and toroidal vortices to expel dust and debris from fluid flow. This type of fluid flow is not found in Parkinson.

Wingrove discloses an apparatus for separating oil from a nitrogen gas stream. There, gas must pass in a zigzagged pattern through a series of folded plates. At each turn, the gas expels oil against the plates. Gravity then drains the oil downward for removal. However, the present invention separates fluid flow with cylindrical and toroidal vortices. Furthermore, the present invention provides a smoother flow than what occurs within the folded plates of Wingrove. Also, the path of fluid flow is sealed from the surroundings to effect a greater degree of separation than possible with Wingrove.

Monson et al. discloses an apparatus for cleaning particulate matter from air. Airflow originates from an annular duct. Then the airflow is redirected outward, and subsequently redirected inward. Upon the inward redirection, fluid partially exits through slits for removal while the remaining airflow continues onward. Because of the centrifugal effects of redirection, the outer part of airflow is dense in particulate matter. The particulate-dense fluid flow is removed through the slits. The present invention, however, is capable of cleaning all fluid, and therefore, need not eject a dirty fluid stream. Furthermore, the instant invention can direct fluid flow into toroidal and cylindrical vortices to produce a more efficient separation.

Michel-Kim discloses a separator utilizing a concentric nozzle design. The outermost annular duct formed within the concentric design provides dirty fluid. The flow is then redirected 180°, partially into an inner annular duct and partially into a central tubular duct. Thus, the fluid flow is split into two fractions after redirection. Because the particles are forced to the outside of the arcuate path during redirection, the fraction traveling through the central duct is dense in particulate matter. Conversely, the flow in the inner annular duct comprises substantially less particulate. The present invention, on the other hand, is capable of substantially cleaning dust and debris from all fluid flow. Thus, disposal of dirty fluid is unnecessary. Additionally, the present invention is capable of redirecting fluid flow any number of times with combined toroidal and cylindrical vortices.

The Richerson patents disclose centrifugal separator designs utilizing a spiraling pathway formed between two spiral-shaped sheets. As air flows through this spiral pathway, airborne particles are thrown against the walls of the spiraling structure. Under the force of gravity, the expelled particles then fall down into a collection trough. The present invention improves on this technology by utilizing both cylindrical and toroidal vortices in a dust cleaner application. Furthermore, the present invention can function independently from gravity, and therefore, may operate in any orientation.

Mignot discloses a filter system capable of preventing the clogging of the filter. Specifically, Mignot utilizes a cylindrical housing containing a concentrically-placed, cylindrically-shaped filter. A fluid inlet and fluid outlet are placed on opposing sides of the housing. An additional fluid outlet is concentrically placed at the end of the filter. In operation, the filter rotates while "dirty" fluid enters via the fluid inlet. As fluid flows in the annular duct between the housing and the filter, the fluid rotates into a cylindrical vortex. When the rotational velocity is high enough, series of counter-rotating toroidal vortices form in the annular duct. The vortex fluid flow throws particles outward while allowing some fluid to flow inward. The fluid flowing inward passes through the filter and exits the fluid outlet therein. The remaining "dirty" fluid flow exits the fluid outlet of the housing. Because of the fluid flow throwing particles outward, particles do not clog the rotating filter.

The present invention, on the other hand, has eliminated the need for a filter. Additionally, the present invention does not need two fluid outlets (one for "dirty" fluid flow and one for "clean" fluid flow) as Mignot does. Instead, the present invention efficiently separates dust and debris from fluid flow, retains the dust and debris within a collector, and outputs sufficiently cleaned fluid flow.

The Moredock patents discloses a centrifugal separator that ejects particles radially. In order to create a cyclone, Moredock directs the air entering the cyclone chamber tangentially with respect to the chamber's wall. Therefore, the chamber's wall forces the air into the cyclone flow pattern. Additionally, the speed of airflow in the cyclone is that of the incoming flow. Further, Moredock ejects particles from the dome via a slot running vertically along the wall. The slot leads into a duct traveling away from the apparatus. Thus, the duct allows air to exit along with the particles.

It would be preferable to create the cylindrical flow and the necessary suction in a single step. Such an arrangement has energy and efficiency advantages over Moredock's configuration. Also it would be an improvement to spin incoming fluid at the blade speed of an impeller, and consequently, achieve a higher rate of rotation than is possible with Moredock's configuration. Furthermore, it would be an improvement to retain the dust-laden fluid within the system to prevent dust from escaping into the atmosphere, and not allow fluid to exit until it has been sufficiently cleaned.

Jen discloses a cylindrically shaped filter system utilizing Dean Flow. Here, fluid flow is guided along a spiral pathway around a cylindrical filter. When fluid flow reaches a critical flow velocity, Dean Flow currents are developed as opposing pairs of corkscrew vortices that travel along the spiral fluid flow path. Dean Flow creates a strong shear cleaning current along the filter surface preventing particles from becoming entrapped by the filter. The fluid that flows through the filter exits the system as filtrate while the fluid flow that remains in the spiral path exits as concentrate. Conversely, the present invention eliminates the need for filters and does not have separate concentrate and filtrate output.

Thus, there is a clear need for a simple, light weight, efficient, quiet, and filterless separator using both toroidal and cylindrical vortices. The art is devoid of such a device, but the present invention meets these needs.

SUMMARY OF THE INVENTION

The technology disclosed herein extends from and improves upon technology disclosed in the co-pending application entitled "Combined Toroidal and Cylindrical Vortex Dust Separator," filed Feb. 20, 2003, which is hereby incorporated herein by reference. This invention is an advancement over matter extending from co-pending application entitled "Filterless Folded and Ripple Dust Separators and Vacuum Cleaners Using the Same," filed Feb. 19, 2003, which is hereby incorporated herein by reference. This application is an extension and improvement upon matter disclosed in co-pending application entitled "Axial Flow Centrifugal Dust Separator," filed Dec. 12, 2002, which is hereby incorporated herein by reference. This application extends from and advances upon technology from Applicant's invention disclosed in co-pending application Ser. No. 10/025,376 entitled "Toroidal Vortex Bagless Vacuum Cleaner Centrifugal Dust Separator," filed Dec. 19, 2001, which is hereby incorporated herein by reference. Furthermore, the separator of this application is an improvement extending from technology disclosed in co-pending application Ser. No. 09/835,084 entitled "Toroidal Vortex Bagless Vacuum Cleaner," filed Apr. 13, 2001, which is hereby incorporated herein by reference. Additionally, the bagless vacuum cleaner of this invention is an advancement extending from technology disclosed in the co-pending application Ser. No. 09/829,416 entitled "Toroidal and Compound Vortex Attractor," filed Apr. 9, 2001, which is hereby incorporated herein by reference. The attractors disclosed therein improve upon technology extending from matter disclosed in co-pending application Ser. No. 09/728,602 entitled "Lifting Platform," filed on Dec. 1, 2000, which is hereby incorporated herein by reference. Finally, the lifting platform technology is an extension advancing over technology disclosed in co-pending application Ser. No. 09/316,318 entitled "Vortex Attractor," filed May 21, 1999, which is hereby incorporated herein by reference.

As indicated above, the present invention is an improvement upon and extension of the combined toroidal and cylindrical vortex fluid flow separator of a parent application. Therein, both cylindrical and toroidal vortices are utilized to effectively eject dust and debris from fluid flow under the combined effect of these vortices. The flow dynamics also create a pressure in the annular collector greater than the pressure in the fluid flow due to the kinetic energy of the fluid. This high pressure stabilizes the vortices, without inhibiting dust particles from traveling straight into the collector.

Also indicated above, the present invention extends from improvements of folded separators of a parent application. Here, fluid flow is redirected repeatedly into a zigzagging path. During each redirection dust and debris are ejected from the fluid flow into collectors. As in the centrifugal separators of parent application, pressure differentials stabilizes the redirected fluid flow while allowing the dust and debris to be ejected into the collectors. The folded dust separator can effect an arbitrary number of redirections to reach any desired level of separation.

The present invention combines the advantages of these two inventions to produce an apparatus that both combines toroidal and cylindrical vortices and can effect an arbitrary number of redirections of fluid flow into partial toroidal vortices. Therefore, an efficient separation mechanism can be employed any number of times. As fluid flow enters a separator of the present invention, it undergoes a similar process as disclosed for the combined toroidal and cylindrical vortex separator. After the first partial toroidal vortex is formed, the present invention redirects fluid flow into additional partial toroidal vortices, thereby ejecting dust and debris into additional annular collectors further cleaning fluid flow. After the desired number of redirections, the fluid flow exits the separator.

Unlike traditional centrifugal separation, the separators of the present invention spin fluid around at the blade speed of the impeller. Thus, the system acts like a high speed centrifuge capable of removing very small particles from the fluid flow. Additionally, the present invention guides fluid flow into a series of partial toroidal vortices having a small inner radii. Because these radii are so small, particles are effectively removed from the fluid flow. Moreover, the combined toroidal and cylindrical fluid flows effect more efficient separation than either flow alone. Importantly, no vacuum bags, liquid baths, or filters are required.

One of the main features of the present invention is the inherently low power consumption. Specifically, conventional bags and filters resist fluid flow, thus requiring greater power to maintain a given flowrate. Operating without bags or filters, the present invention circumvents this problem. Additionally, since only smooth directional changes of fluid flow are made in the present invention, the effect on the energy of the moving fluid is minimal. Hence, the present invention contains provisions not already considered in the art. Furthermore, the design is expected to be virtually maintenance free.

Also, the possibility of excessive fluid flow into and out of the collector of the present invention can be disruptive. This may be minimized, however, by strategically placing baffles inside the collectors. Alternatively, electrostatically charged members may be placed within the collectors to attract and capture dust and debris. Additionally, valves may also be placed at the inlet or outlet of the separator to regulate fluid flow. By controlling fluid flow with valves, the efficiency can be maximized for a variety of circumstances.

In an alternative embodiment of the present invention, the entire separator may rotate with the impeller. Because the collectors are rotating, the dust and debris are forced to the outer walls and consequently, will have a lesser chance to escape.

Thus, it is an object of the present invention to utilize cylindrical vortices in a separator application.

Further, it is an object of the present invention to utilize toroidal vortices in a separator application.

Moreover, it is an object of the present invention to utilize the combined effects of toroidal and cylindrical vortices in a separator application.

Additionally, it is an object of the present invention to provide an efficient separator.

It is a further object of the present invention to provide a lightweight separator.

In addition, it is an object of the present invention to provide a low-maintenance separator.

It is yet another object of the present invention to provide a bagless separator.

It is a further object of the present invention to provide a separator that does not require filters.

It is also an object of the present invention to provide non-rotating, substantially dust-free and debris-free fluid as a product.

Also, it is an object of the present invention to provide a dust separator that minimizes exchange of fluid between the separation chamber and collector.

Moreover, it is an object of the present invention to smoothly guide fluid flow through a separation system.

Thus, it is an object of the present invention to provide a separator that is capable of separating large debris from fluid.

It is a further object of the present invention to provide a separator that is capable of separating fine debris, e.g., dust, from fluid.

It is yet another object of the present invention to provide a separator which may have a large cross-sectional area and a small radius of curvature for ejecting particles.

Additionally, it is an object of the present invention to provide a collector for a separator that maintains fluid flow geometry via pressure differentials without jeopardizing dust and debris collection.

Furthermore, it is an object of the present invention to provide a separator that minimizes parasitic fluid flow.

Moreover, it is an object of the present invention to provide a separator capable of handling large flowrates.

It is also an object of the present invention to provide a separator capable of directing fluid flow into multiple partial toroidal vortices.

It is yet another embodiment of the present invention to provide a vacuum cleaner system which fulfills any or all objects of the present invention.

These and other objects will become readily apparent to one skilled in the art upon review of the following description, figures, and claims.

SUMMARY OF THE DRAWINGS

A further understanding of the present invention can be obtained by reference to a preferred embodiment, along with some alternative embodiments, set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, detailed illustrative embodiments of the present invention are disclosed herein. However, techniques, systems and operating structures in accordance with the present invention may be embodied in a wide variety of forms and modes, some of which may be quite different from those in the disclosed embodiments. Consequently, the specific structural and functional details disclosed herein are merely representative, yet in that regard, they are deemed to afford the best embodiments for purposes of disclosure and to provide a basis for the claims herein which define the scope of the present invention. The following presents a detailed description of a preferred embodiment (as well as some alternative embodiments) of the present invention.

Certain terminology will be used in the following description for convenience in reference only and will not be limiting. The words "in" and "out" will refer to directions toward and away from, respectively, the geometric center of the device and designated and/or reference parts thereof. The words "up" and "down" will indicate directions relative to the horizontal and as depicted in the various figures. Such terminology will include the words above specifically mentioned, derivatives thereof, and words of similar import.

Figure 1:
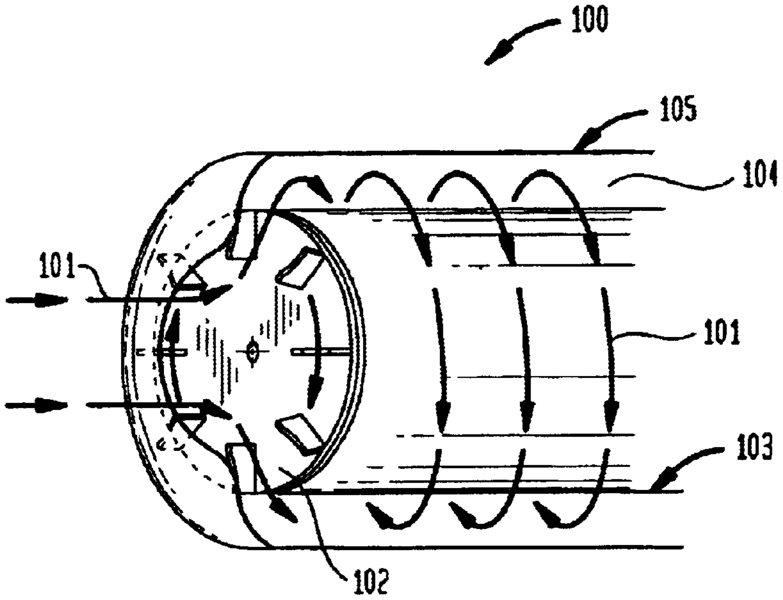
FIG. 1 (PRIOR ART)
FIG. 1 (FIG. 1) (PRIOR ART) depicts a perspective view of a cylindrical vortex separator.
Figure 2A:
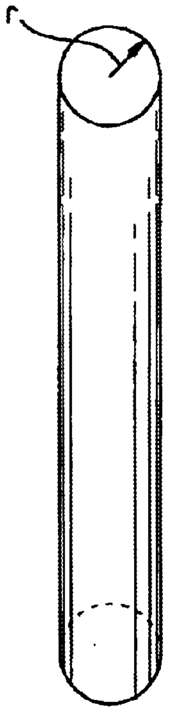
FIGS. 2A and 2B (FIGS. 2A and 2B) depict side and perspective views, respectively, of a combined toroidal vortex and cylindrical vortex fluid flow.
Figure 2B:
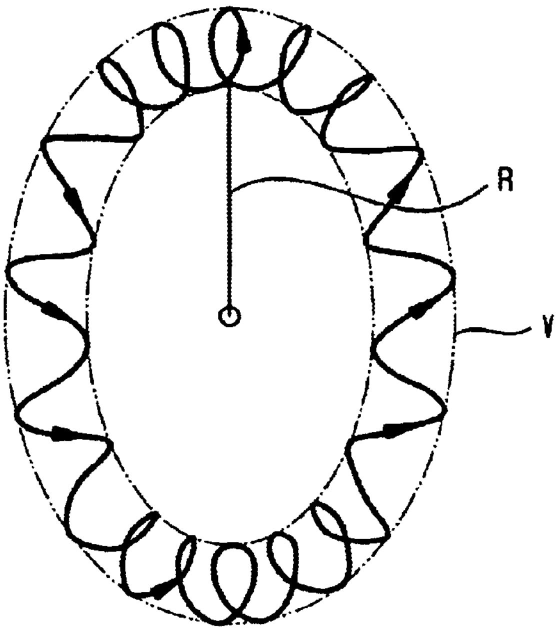
Figure 3:
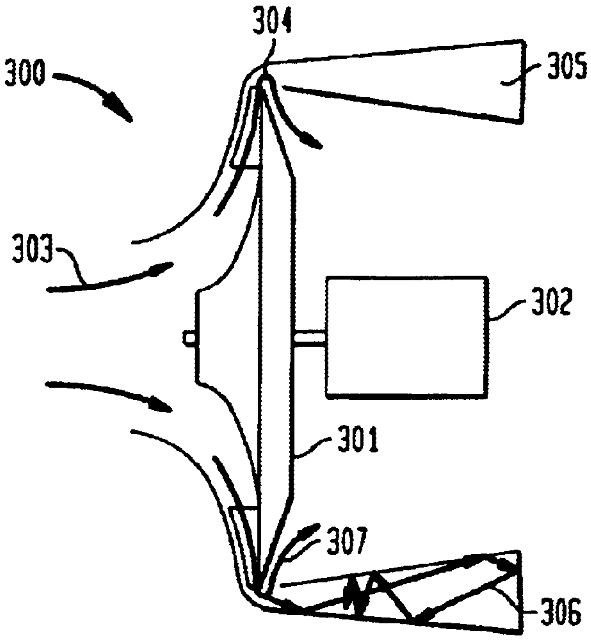
FIG. 3 (PRIOR ART)
FIG. 3 (FIG. 3) (PRIOR ART) depicts a side, cross-sectional view of a combined toroidal and cylindrical vortex separator.

In FIG. 3, combined toroidal and cylindrical vortex separator 300 of a parent application is depicted. Here, the combined effects of toroidal and cylindrical vortices are utilized to produce a more efficient separation process than provided by either flow individually. Importantly, dust and debris are ejected into annular collector 305. A high pressure built up in annular collector 305 stabilizes the vortex fluid flows without preventing the ejection of dust and debris.

Figure 4:
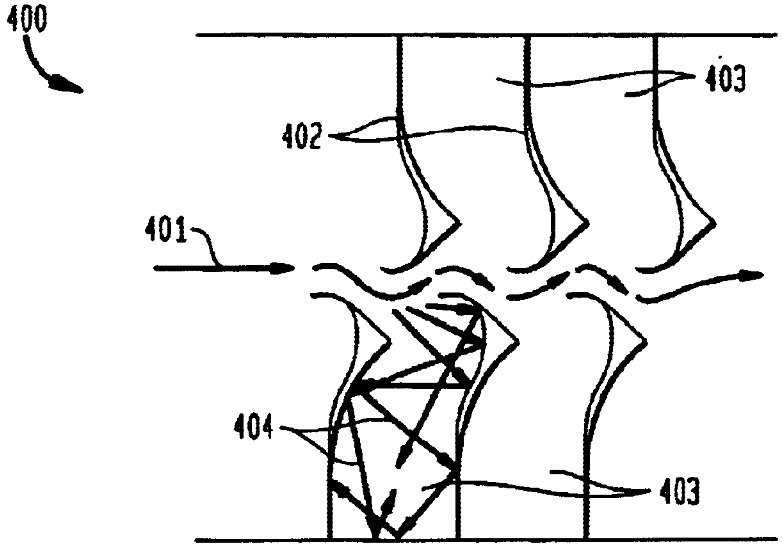
FIG. 4 (PRIOR ART)
FIG. 4 (FIG. 4) (PRIOR ART) depicts a side, cross-sectional view of a folded dust separator.

In FIG. 4, folded separator 400 of a parent application is disclosed. Here, fluid flow 401 is redirected multiple times by deflectors 402. Upon each redirection, dust and debris are ejected into collectors 403. Again, the flow geometry is stabilized by higher pressures in collectors 403. The higher pressures, however, do not inhibit dust and debris from being ejected into collectors 403.

Figure 5:
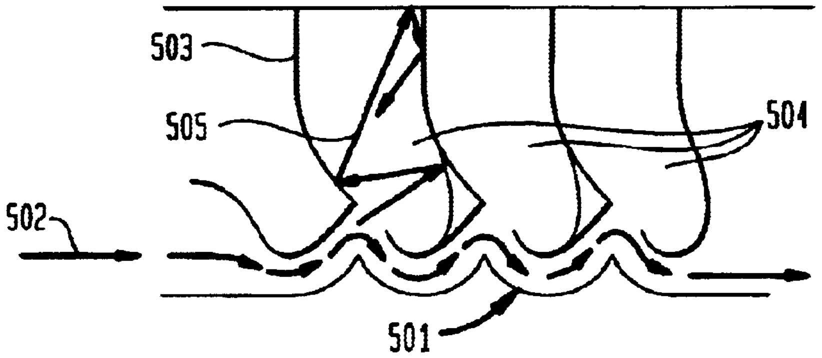
FIG. 5 (FIG. 5) depicts an intermediate adaptation which leads to the development of the present invention.

The present invention is an apparatus capable of combining the fluid flows described for the two previous inventions, and therefore, significantly improving separation. Thus, the present invention utilizes both toroidal and cylindrical vortices while redirecting fluid flow repeatedly. The first step in the development of the present invention is the modification of folded separator 400 to only collect dust and debris on one side. Such a modification is shown in FIG. 5. The lower row of deflectors and collectors have been replaced by contoured guide 501. Contoured guide 501 guides fluid flow 502 along a similar path as deflectors 402 and collectors 403 of folded separator 400 of FIG. 4. Deflectors 503 and collectors 504 above fluid flow 502 remain unchanged from those of folded separator 400. Likewise, ejection path 505 of dust and debris particles is also the same above fluid flow 502.

To complete the adaptation into the present invention, contoured guide 501 is extended into a rotating cylinder. Deflectors 503 and collectors 504 should also be extended to conform around the rotating cylinder, thus creating a series of annular collectors. The result is rotating wave dust separator 600 depicted in FIG. 6. As in the combined toroidal and cylindrical vortex separator, fluid flow 601 enters into impeller 602 and is spun into a cylindrical vortex by blade 603. Preferably, impeller 603 is attached to rotating cylinder 604 and powered by motor 605. Rotating cylinder 604 preferably comprises a rough, contoured surface to guide and help maintain the speed of fluid flow 601 through the system. Also, annular deflectors 606 (supplemented by rotating cylinder 604) guide fluid flow into multiple partial toroidal vortices. Annular deflectors 606 form annular collectors 607. As discussed above, the toroidal vortex fluid flow is stabilized by pressure differentials between annular collectors 607 and fluid flow 601. This pressure differential, however, does not inhibit denser dust and debris particles from being ejected into annular collectors 607. Typical ejection path 608 may be taken by a dust and debris particle. The particle will eventually slow down due to friction and inelastic bouncing. As is apparent from FIG. 6, the system can be constructed with an arbitrary number of annular deflectors 608 (and corresponding number of annular collectors 607) to effect any desired level of separation. Also, annular collectors 607 may varied in size to optimize separation. For instance, collectors 607 may decrease in size in the downstream direction because most dust and debris are captured in annular collector 607 located furthest upstream. Also, the size of the passage into annular collectors 607 may decrease downstream because particles remaining within fluid flow 601 tend to decrease in size in the downstream direction. Housing 610 may be removably constructed or made to open for easy removal of dust and debris from annular collectors 607.

Additionally, annular collectors 607 may comprise baffles 609 to prevent harmful fluid exchange. Furthermore, baffles 609 may be electrostatically charged to attract and prevent the escape of dust and debris. Alternatively, the entire apparatus can be constructed to spin. Thus, the rotation of housing 610, annular collectors 607, and annular deflectors 606 will throw dust and debris against housing 610 thereby preventing escape. To do this, blades 603 may be coupled to housing 610. The system may further comprise flow straightening vanes (not shown) to remove rotating components of fluid flow 601. Also, the separator may comprise valves (not shown) at the inlet or the outlet of fluid flow 601. Valves can be used to meter fluid flow for optimized separation.

Figure 7:
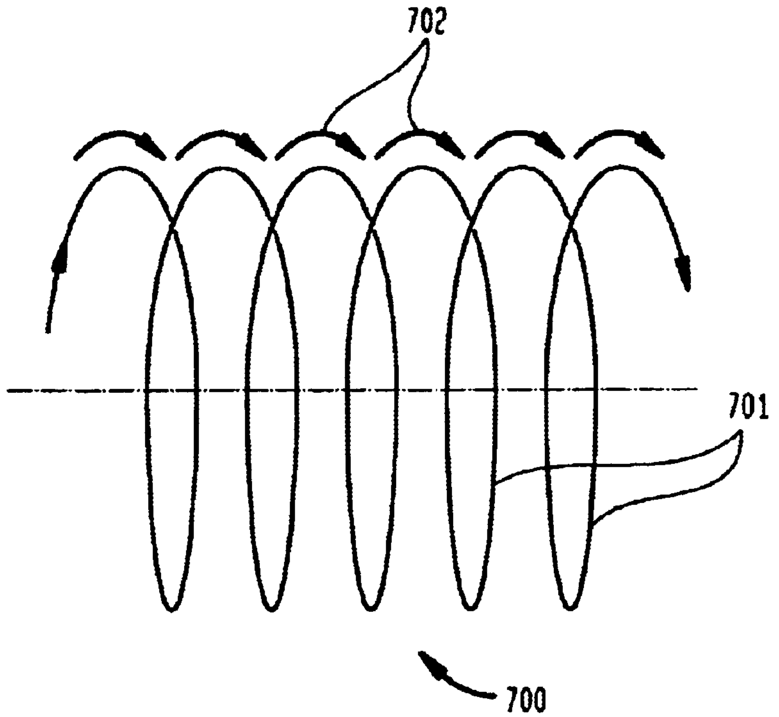
FIG. 7 (FIG. 7) depicts the fluid flow within the present invention.

FIG. 7 depicts a perspective view of fluid flow through the system. Fluid flow 700 has cylindrical vortex component 701 and toroidal vortex component 702. As discussed above, the combination of the two components of fluid flow provide better separation than either component individually.

Separators of the present invention have additional advantages over conventional cyclone separators which create rotational components by tangentially injecting fluid flow into a cyclone chamber. In conventional cyclone separators, if the fluid flow through the system is slowed, the cyclone deteriorates allowing dust and debris to settle. When the fluid flow resumes, it carries dust and debris through the system until the cyclone is revived. In the present invention, a cylindrical vortex is maintained regardless of the speed of fluid flow through the system. Therefore, fluid flow is guaranteed to be cleaned under all conditions.

Figure 6:
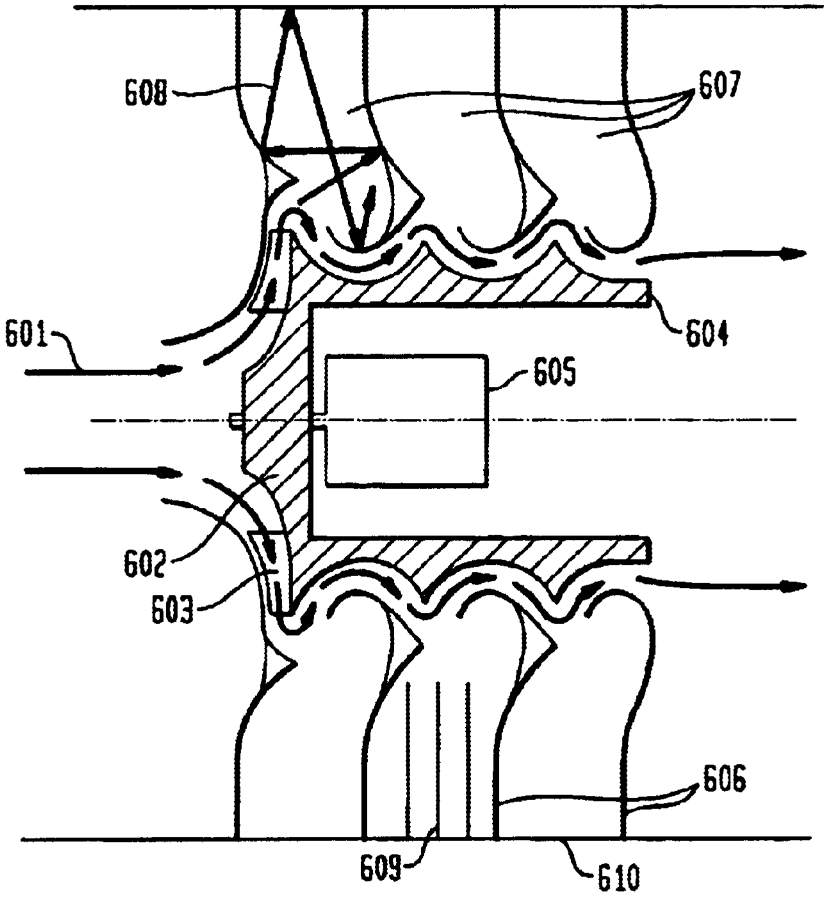
FIG. 6 (FIG. 6) depicts a side, cross-sectional view of the preferred embodiment of the present invention.
Figure 8A:
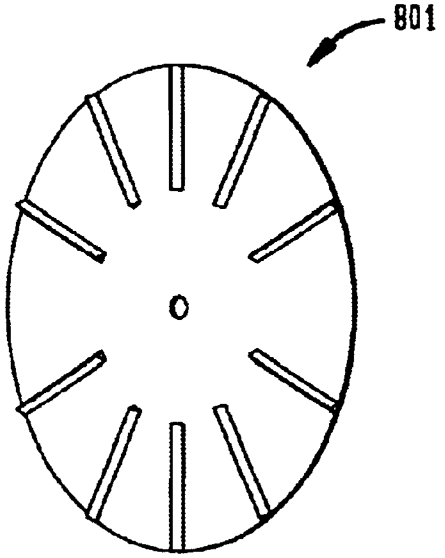
FIG. 8 (FIG. 8) depicts alternative impeller assemblies for use with the present invention.
Figure 8B:
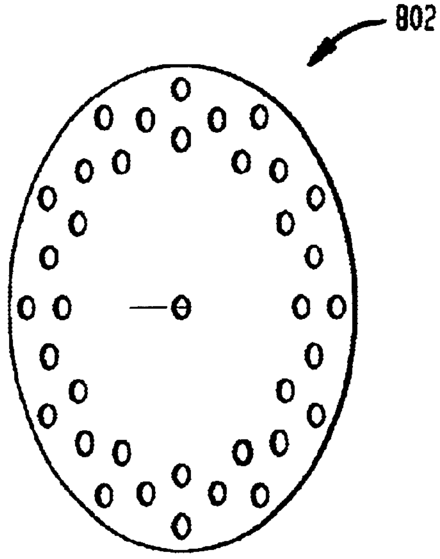

In the preferred embodiment of FIG. 6, impeller 602 creates the cylindrical vortex fluid flow while moving fluid through the system. If, however, the present invention is implemented into a system in which fluid flow is already moving (e.g., a heating duct or traditional water pipe), an impeller that moves fluid flow through the system may not be necessary. In this case, the fluid flow must only be spun into a cylindrical vortex. In this case ribbed impeller 801 or impeller 802 comprising bumps may be used (illustrated in FIGS. 8A and 8B, respectively). These impeller designs require significantly less power to operate. Moreover, these impeller designs may be used to move fluid through the system at slow flowrates. In the case of a slow flowrate, the inner radii of the partial toroidal vortices can be decreased to compensate for the decrease in speed of fluid flow through the system.

In another alternative embodiment of the present invention, housing 610, annular deflectors 606, and annular collectors 607 can be made to rotate with impeller 602. This may be done by attaching blades 603 to housing 610. The rotation of annular collectors 607 throws dust and debris outward further preventing escape.

Figure 9:
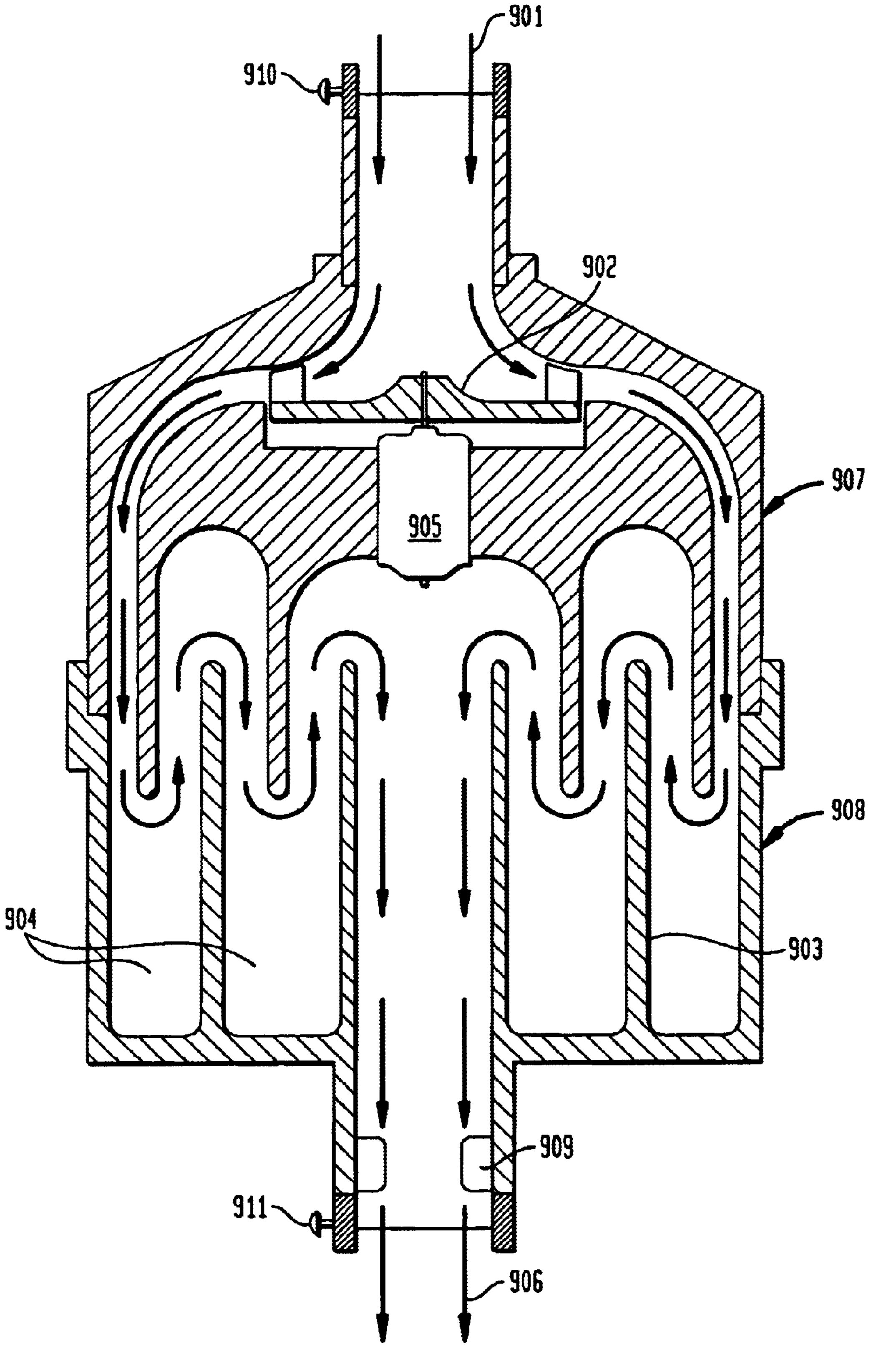
FIG. 9 (FIG. 9) depicts an alternative embodiment of the present invention.

Yet, an alternative embodiment of the present invention is disclosed in FIG. 9. Fluid flow 901 is impelled by impeller 902 (powered by motor 905) into a cylindrical vortex. Fluid flow is guided into partial toroidal vortices by a series of partitions 903. Dust and debris are ejected into annular collectors 904. Cleaned fluid flow 906 exits the system. As in the embodiment disclosed above, fluid flow geometry is maintained by pressure differentials that do not jeopardize separation. Upper housing 907 may be made detachable from lower housing 908 for easy removal of dust and debris. Upon exiting the apparatus, cleaned fluid flow 906 may be straightened by flow straightening vanes 909 eliminating rotating components of fluid flow 901. Valves 910 and 911 may also be implemented to optimally control fluid flow through the apparatus.

Figure 10:
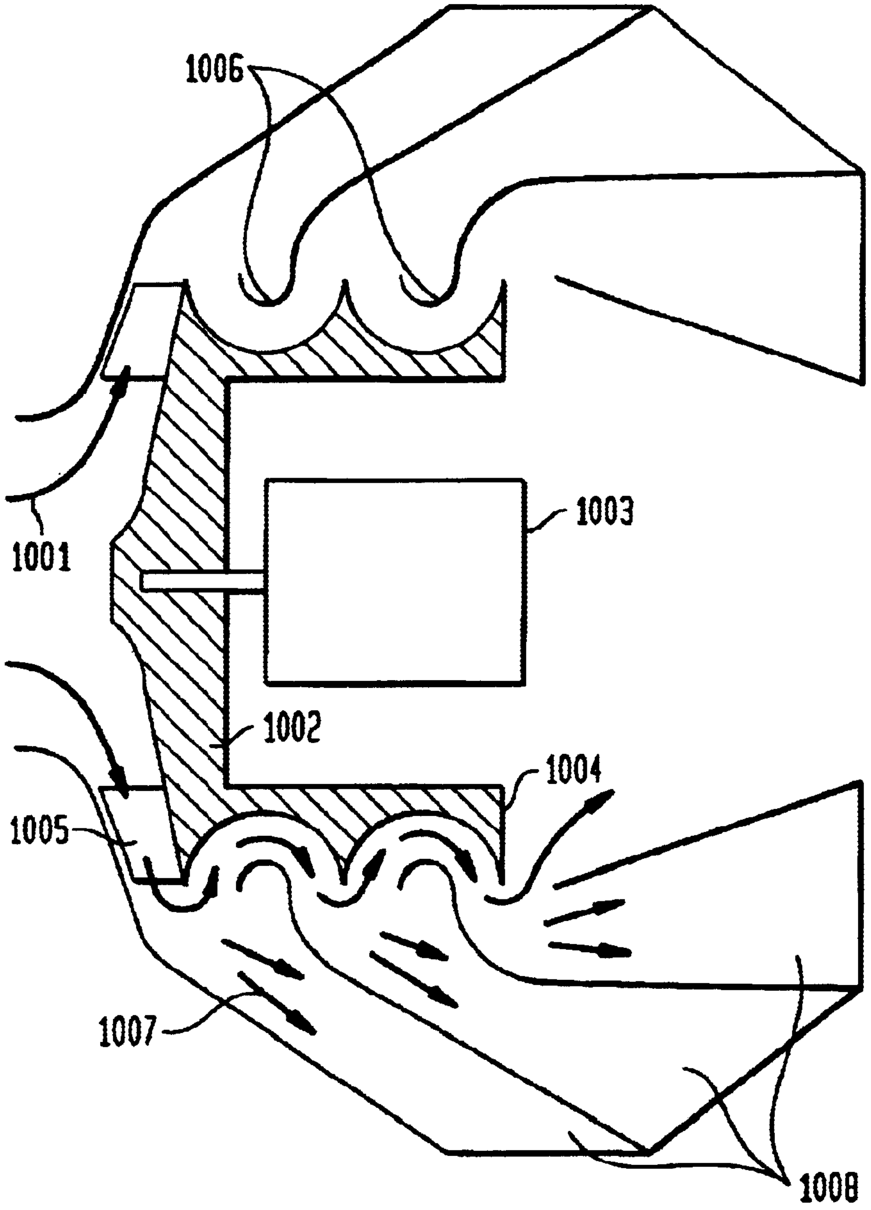
FIG. 10 (FIG. 10) depicts another alternative embodiment of the present invention.

Another alternative embodiment of the present invention is disclosed in FIG. 10. Fluid flow 1001 is impelled into the apparatus by impeller 1002 under the power of motor 1003. Contoured guide 1004 is attached to impeller 1002 and preferably, has a rough surface. Blades 1005 spin fluid flow 1001 into a cylindrical vortex. As in previous embodiments, contoured guide 1004 and a series of annular deflectors 1006 guide fluid flow into a series of partial toroidal vortices. Under the combined effect of toriodal and cylindrical vortices, dust and debris 1007 are ejected into annular collectors 1008. Like embodiments disclosed above, pressure differentials stabilize the combined vortex fluid flow without preventing ejection of dust and debris 1007. Furthermore, the tapered design of annular collectors 1008 can prevent dust and debris 1007 from bouncing back into fluid flow 1001. Baffles, electrostatically charged members, flow straightening vanes, and any other features disclosed herein may be implemented into this embodiment to optimize performance. Additionally, the entire apparatus may be made to rotate such that the rotation of annular collectors 1008 throw dust and debris 1007 outward, thereby preventing their escape.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. An apparatus for separating matter from a fluid flow comprising:

fluid flow generation means for imparting a cylindrical vortex fluid flow to said fluid flow; and guide means for forcing said fluid flow into a plurality of partial toroidal vortices;

wherein said cylindrical vortex fluid flow and said toroidal vortex fluid flow eject said matter from said fluid flow.

2. An apparatus according to claim 1 further comprising at least one collection means for collecting said matter.

3. An apparatus according to claim 1, wherein said fluid flow generation means moves fluid flow through said apparatus.

4. An apparatus according to claim 1, wherein said fluid flow generation means comprises a feature selected from the group consisting of at least one impeller, at least one blade, at least one backplate, at least one bump, and at least one rib.

5. An apparatus according to claim 4, wherein said blade is curved.

6. An apparatus according to claim 1 further comprising at least one flow straightening vane.

7. An apparatus according to claim 2, wherein said collection means comprises a feature selected from the group consisting of at least one baffle and at least one electrostatically charged member.

8. An apparatus according to claim 2, wherein said collection means is annular.

9. An apparatus according to claim 2, wherein said collection means is tapered.

10. An apparatus according to claim 4, wherein said impeller is concave.

11. An apparatus according to claim 4, wherein said impeller is convex.

12. An apparatus according to claim 2, wherein said collection means rotates to prevent escape of said matter from said collection means.

13. An apparatus according to claim 12 further comprising a housing, and wherein said fluid flow generation means comprises at least one blade, said blade being coupled to said housing.

14. An apparatus according to claim 2, wherein pressure in said collection means is higher than the pressure in said fluid flow such that the pressure differential resulting therefrom assists the maintenance of said toroidal vortex fluid flow.

15. An apparatus according to claim 1 further comprising at least one valve.

16. An apparatus according to claim 1, wherein said guide means comprises a plurality of deflectors.

17. An apparatus according to claim 1, wherein said guide means comprises at least one rotating guide.

18. An apparatus according to claim 17, wherein said rotating guide comprises a rough surface.

19. An apparatus according to claim 17, wherein said rotation guide is contoured.

20. An apparatus according to claim 2, wherein said collection means comprises a plurality of collectors, and wherein the size of the passages into said collectors decreases in the downstream direction of said fluid flow.

21. An apparatus according to claim 2, wherein said collection means comprises a plurality of collectors, and wherein the size of said collectors decreases in the downstream direction of said fluid flow.

22. An apparatus according to claim 2, wherein said collection means is constructed to open for removal of said matter.

23. An apparatus according to claim 1 further comprising a motor to power said impeller.

24. An apparatus for separating matter from a fluid flow comprising:

a plurality of deflectors to guide said fluid flow into a plurality of partial toroidal vortices; and at least one impeller, said impeller imparting a cylindrical vortex fluid flow on said fluid flow;

and wherein said cylindrical vortex fluid flow and said toroidal vortex fluid flow eject said matter from said fluid flow.

25. An apparatus according to claim 24 further comprising at least one collector for collecting said matter.

26. An apparatus according to claim 24, wherein said impeller moves fluid flow through said apparatus.

27. An apparatus according to claim 24, wherein said impeller comprises a feature selected from the group consisting of at least one impeller, at least one blade, at least one backplate, at least one bump, and at least one rib.

28. An apparatus according to claim 27, wherein said blade is curved.

29. An apparatus according to claim 24 further comprising at least one flow straightening vane.

30. An apparatus according to claim 25, wherein said collector comprises a feature selected from the group consisting of at least one baffle and at least one electrostatically charged member.

31. An apparatus according to claim 25, wherein said collector is annular.

32. An apparatus according to claim 25, wherein said collector is tapered.

33. An apparatus according to claim 24, wherein said impeller is concave.

34. An apparatus according to claim 24, wherein said impeller is convex.

35. An apparatus according to claim 25, wherein said collector rotates to prevent escape of said matter from said collector.

36. An apparatus according to claim 35 further comprising a housing, and wherein said impeller comprises at least one blade, said blade being coupled to said housing.

37. An apparatus according to claim 25, wherein pressure in said collector is higher than the pressure in said fluid flow such that the pressure differential resulting therefrom assists the maintenance of said toroidal vortex fluid flow.

38. An apparatus according to claim 24 further comprising at least one valve.

39. An apparatus according to claim 25, wherein said apparatus comprises a plurality of collectors, and wherein the size of the passages into said collectors decreases in the downstream direction of said fluid flow.

40. An apparatus according to claim 25, wherein said apparatus comprises a plurality of collectors, and wherein the size of said collectors decreases in the downstream direction of said fluid flow.

41. An apparatus according to claim 24 further comprising at least one rotating guide.

42. An apparatus according to claim 41, wherein said rotating guide comprises a rough surface.

43. An apparatus according to claim 41, wherein said rotating guide is contoured.

44. An apparatus according to claim 25, wherein said collector is constructed to open for removal of said matter.

45. An apparatus according to claim 24 further comprising a motor to power said impeller.

46. A method for separating matter from a fluid flow, said method comprising the steps of:

moving said fluid flow in a cylindrical vortex; and moving said fluid flow in a series of partial toroidal vortices;

wherein said cylindrical vortex and at least one of said toroidal vortices cause said fluid flow to eject said matter therefrom.

47. A method according to claim 46, said method comprising the step of:

collecting said matter after being ejected from said fluid flow from at least one of said partial toroidal vortices.

48. A method according to claim 46, said method further comprising the step of:

straightening said fluid flow after ejecting said matter therefrom.

49. A method according to claim 46, said method further comprising the step of:

moving said fluid flow axially with respect to said cylindrical vortex.

50. A method according to claim 46, said method further comprising the step of:

maintaining said toroidal vortex fluid flow with a pressure that is higher than the pressure in said fluid flow.

* * * * *